Feb. 7, 1967          E. B. DOHNER                3,302,814
                     FLUID CORE JOINT
Filed Sept. 16, 1963                          5 Sheets-Sheet 1

INVENTOR

ELWOOD B. DOHNER
BY Sheridan and Ross

ATTORNEY

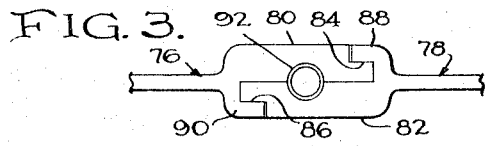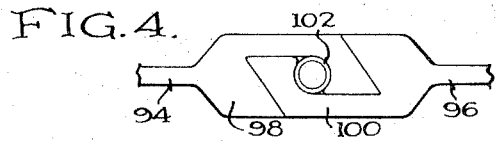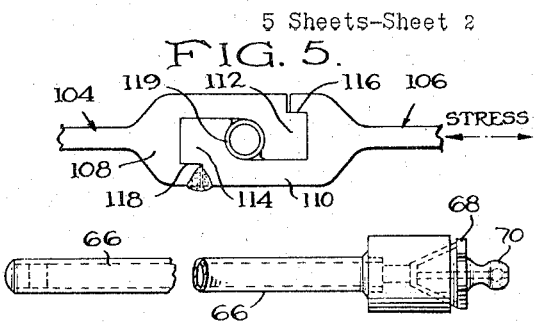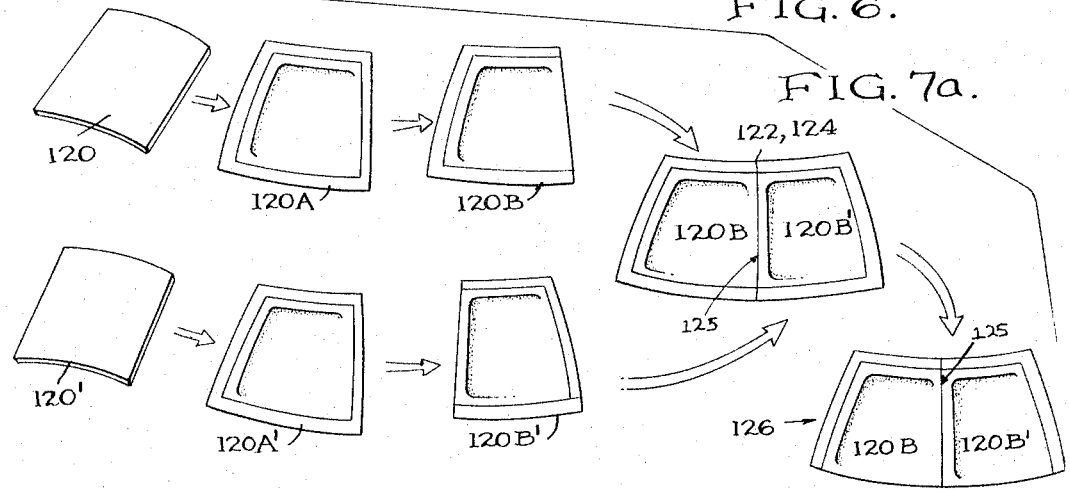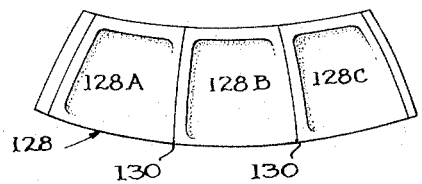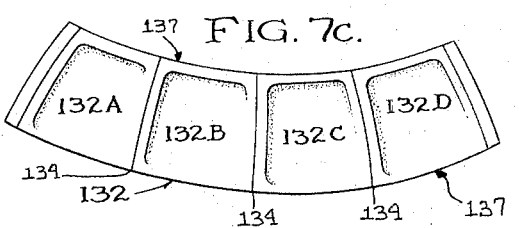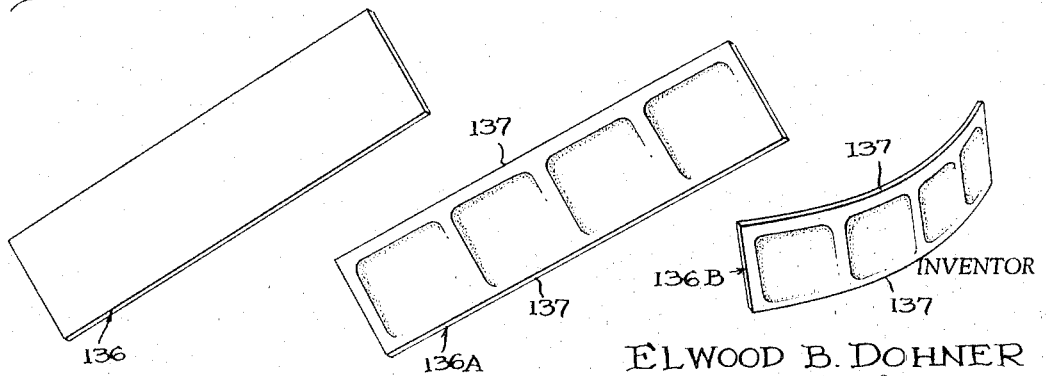

Feb. 7, 1967   E. B. DOHNER   3,302,814
FLUID CORE JOINT
Filed Sept. 16, 1963   5 Sheets-Sheet 3

INVENTOR
ELWOOD B. DOHNER
BY Sheridan and Ross
ATTORNEY

Feb. 7, 1967 E. B. DOHNER 3,302,814
FLUID CORE JOINT
Filed Sept. 16, 1963 5 Sheets-Sheet 4

INVENTOR
ELWOOD B. DOHNER
BY Sheridan and Ross
ATTORNEY

Feb. 7, 1967 E. B. DOHNER 3,302,814
FLUID CORE JOINT
Filed Sept. 16, 1963 5 Sheets-Sheet 5

INVENTOR
ELWOOD B. DOHNER
BY Sheridan and Ross
ATTORNEY

United States Patent Office 3,302,814
Patented Feb. 7, 1967

3,302,814
FLUID CORE JOINT
Elwood B. Dohner, Littleton, Colo., assignor to Martin-Marietta Corporation, Baltimore, Md., a corporation of Maryland
Filed Sept. 16, 1963, Ser. No. 309,210
5 Claims. (Cl. 220—5)

This invention relates to mechanical joints between structural members, and more particularly to a joint construction and method of jointing in which the structural members are forced into and held in securely interlocked relation with each other by means of an internal core of hardenable initially fluid material which is positioned in an interior cavity in the structural members forming the joint, and to structures including such joints.

The structural joint and method of jointing of the invention have particular utility in the construction of large fluid-tight pressure vessels, such as those used with missiles or other space vehicles, and will be described as embodied in such devices. However, the joint construction of the invention also has utility in many other types of applications.

Certain types of tank-like members used with missiles or other space vehicles are frequently of such large size as to present a considerable transportation problem if such tanks are fabricated at a factory and transported in completed form to the site of use. Hence, it has been proposed that the component sections of such tanks be shipped to the point of use and assembled at that point. However, on-site assembly of such tanks in accordance with prior art methods has had certain serious disadvantages.

For example, one rather unsatisfactory approach to on-site assembly involves structural welding of the component parts which requires the use of large expensive tools built to extreme accuracies. Such tools are generally very limited in their capability and do not lend themselves to conversion to new projects. Structural welding at the site of use also requires the use of a large hydrostatic or gas test facility for proof-pressure testing of the welded tanks.

Accordingly, it is an object of this invention to provide a mechanical joint for rigidly interconnecting structural members together in accordance with which the structural members are held in rigidly secured interlocked relation substantially without the use of bolts or pins, and entirely without structural welding.

Another object of the invention is to provide an improved fluid-tight mechanical joint which is particularly suitable for use in joining panels or skins which form wall sections of large tanks such as those used on missiles or other space vehicles.

It is another object of the invention to provide an improved mechanical joint construction which facilitates on-the-site assembly of large tank-like members used as part of a space vehicle.

Another object of the invention is to provide a joint construction for use in on-the-site assembly of large tanks, such as those used in space vehicles and the like, which permits factory fabrication of the components and shippable sub-assemblies, and shipment of the sub-assemblies for final assembly at the site of use.

Another object of the invention is to provide a joint or splice for structural panels or skin members or the like which does not require highly accurately executed machining operations in regard to overall sizing to allow for proper assembly, since subsequent machining operations are carried on during the assembly steps which, in effect, machine out tolerances accumulated during the assembly operations.

Another object of the invention is to provide a method of fastening which is adapted for "in space" assembly or fabrication and substantially eliminates impacts associated with riveting and other fastening techniques which would tend to change the position, course, and/or attitude of an in-space structure during fabrication or joining operations.

Another object of the invention is to provide a method of jointing wall sections of a large tank or the like which does not require the use of proof-pressure testing, as required in the case of pressure vessels which are structurally welded.

In achievement of these objectives, there is provided in accordance with this invention fluid-tight structural joint and method of forming such a joint in accordance with which the members to be joined are provided with cooperating interengaging surface areas which define a cavity to receive a core of hardenable fluid material confined within an expandable thin-walled tube. A hardenable fluid material is introduced under pressure into the thin-walled tube and the core is expanded within the cavity to force the members forming the joint into rigidly assembled relation to each other when the fluid material hardens. The fluid core joint construction and method of jointing may be used to join small unit panels into shippable sub-assemblies, with the shippable sub-assemblies being later joined together at the site of use into the final assembly by similar fluid core joints. In another embodiment of the invention, the structural members being joined together may be contoured to receive movable wedges which are forced by the expanding fluid core into wedged engagement with the members being joined, to thereby rigidly hold the joint structure together when the fluid material hardens. In another embodiment of the invention, the expandable fluid core may be secured to a head or cap portion and be used as an expandable bolt which is received in passages in the members being joined. The fluid core bolt is expanded into engagement with the members being joined to thereby rigidly hold the members together when the fluid core hardens. The fluid core may also serve as a pivotal axis for a pair of angularly adjustable members which are held in rigidly assembled relation at a fixed angular position with respect to each other when the fluid core hardens.

Further objects and advantages of the invention will become apparent from the following description taken in conjunction with the accompanying drawings in which.

FIGS. 3, 4, and 5 are schematic views of modified types of joints using the fluid core in accordance with the invention;

FIGURE 6 is an alternative concept for a pre-fabricated type core unit that may be used in the joints of FIGS. 1–5, inclusive, when it is not desirable to use standard M.S. (Military Standard) tube fittings and ordinary thin-wall tubing.

Figure 8A:
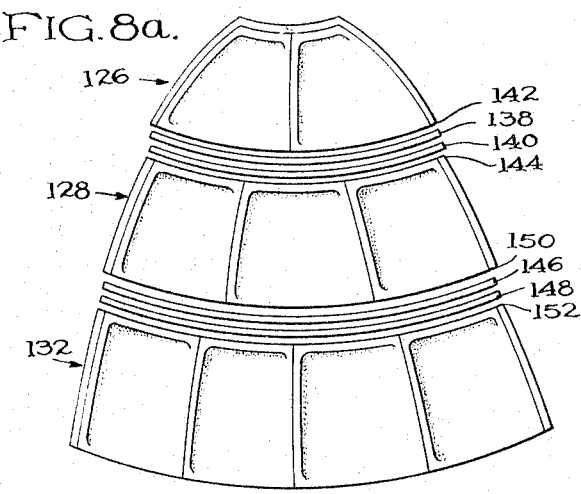
Figure 8B:
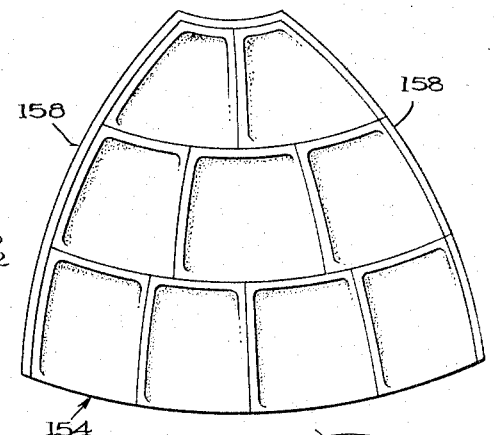
Figure 8C:
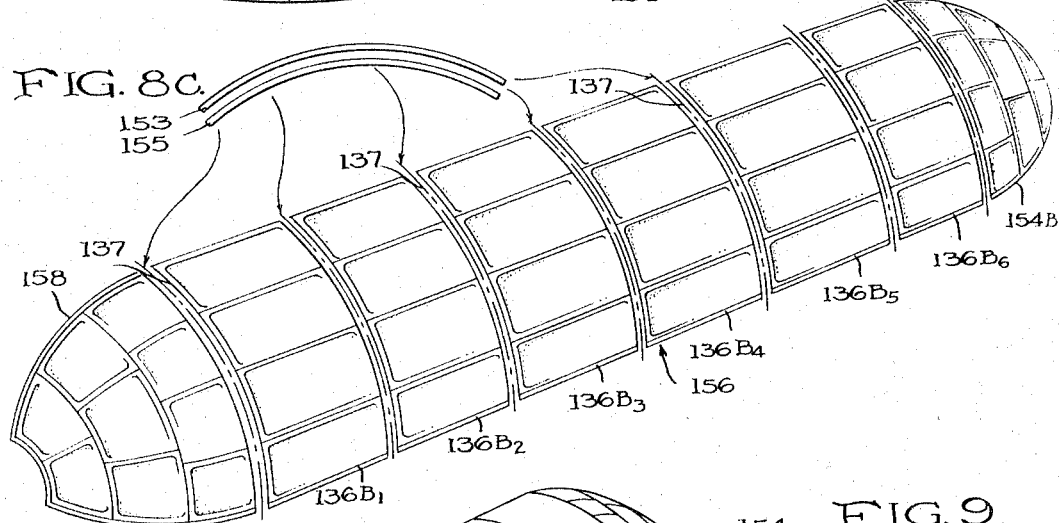
Figure 9:
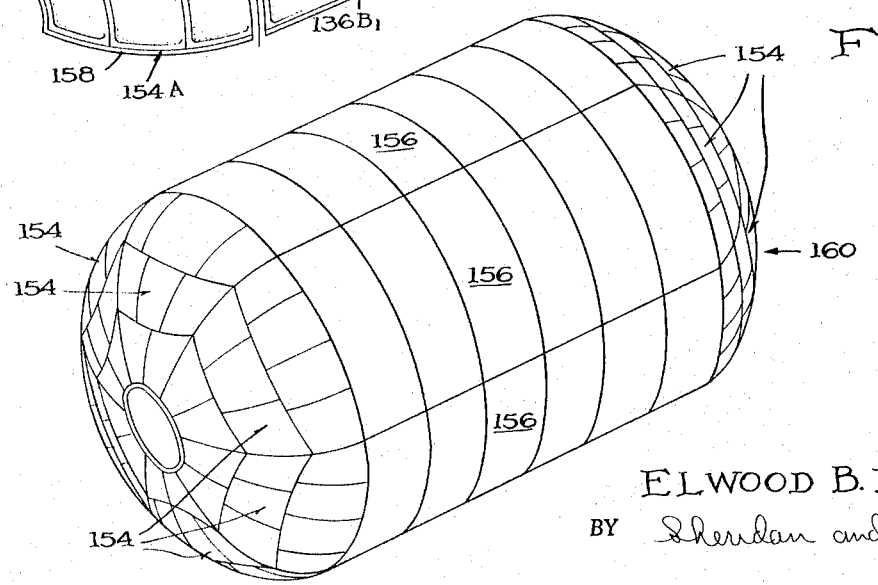
Figure 10:
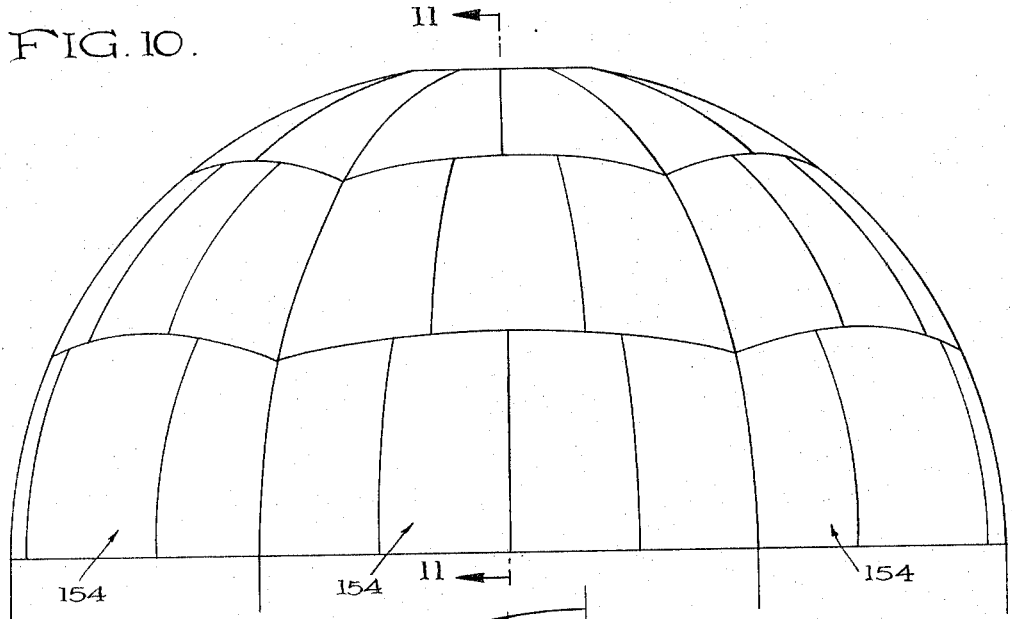
Figure 11:
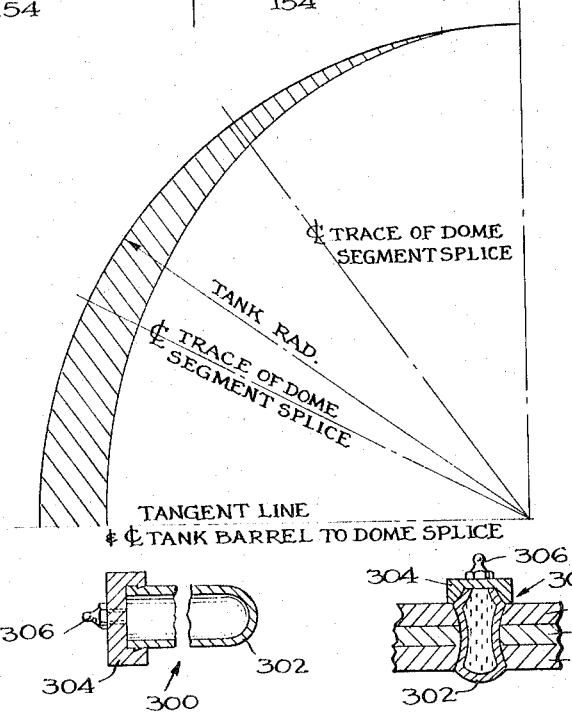
Figures 14, 15, 16:
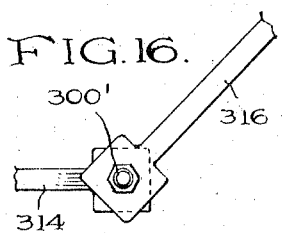
Figure 12:
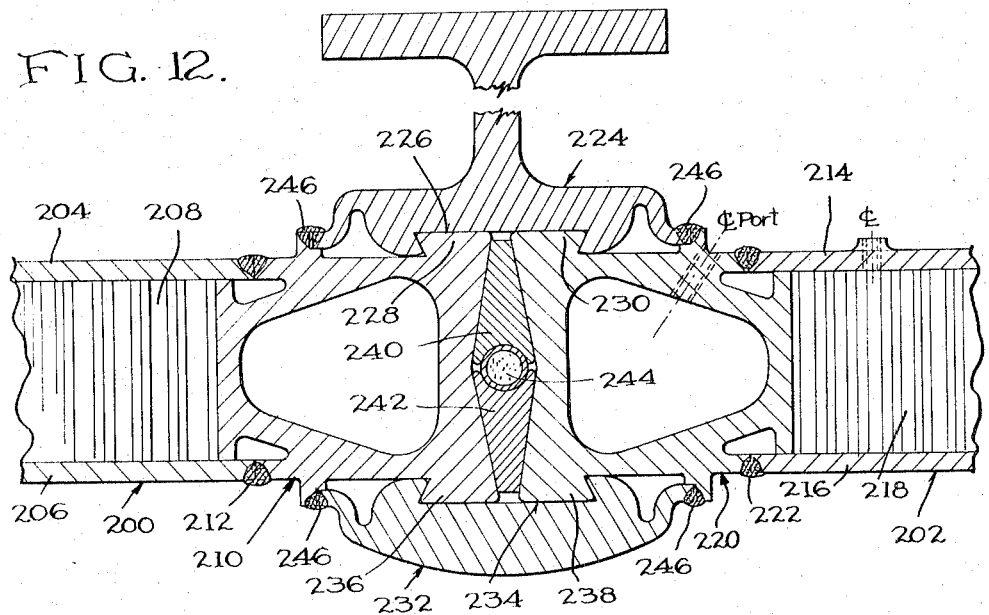
Figure 13:
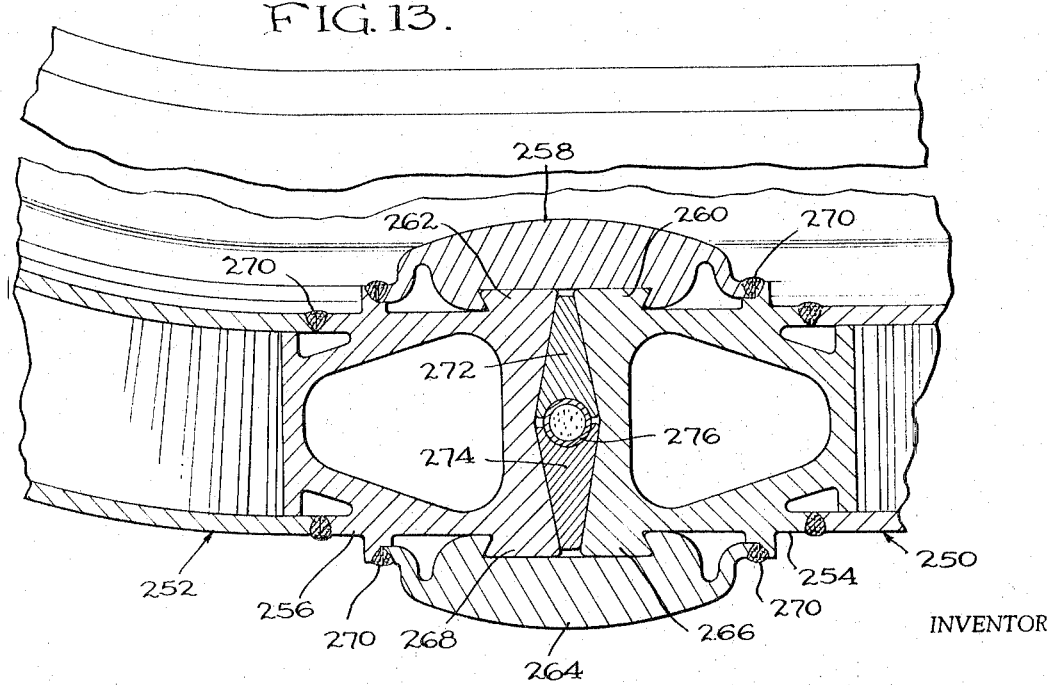

FIGS. 7a–7d, inclusive, are diagrammatic views showing the manner of fabricating the various panel or skin shippable sub-assemblies at the factory for subsequent assembly at the site of utilization;

FIGS. 8a–8c, inclusive, are diagrammatic views showing the manner of assembling the shippable sub-assemblies of FIGS. 7a–7d into final sub-assemblies at the site of utilization;

FIG. 9 is a perspective view, partially diagrammatic, of a completed tank assembled at the site of utilization from the final sub-assemblies of FIGS. 8a–8c, inclusive;

FIG. 10 is an elevation view of one of the hemispherical dome members of the completed tank assembly;

FIG. 11 is a view taken along section line 11—11 of FIG. 10 showing the geometry of the splices of the dome segments;

FIG. 12 is a view in transverse section showing a modified type of fluid core joint between adjacent panels or skins of an outer tank wall;

FIG. 13 is a view in transverse section of a fluid core joint of the type shown in FIG. 12 as applied to the transition joint between the cylindrical barrel of the tank and the hemispherical dome of the tank;

FIG. 14 is a view in longitudinal section of a fluid core bolt in accordance with the invention;

FIG. 15 is a view of the fluid core bolt of FIG. 14 in position and securing three panels in assembled relation to each other; and FIG. 16 is a side elevation view of two structural elements which are pivotally movable about a fluid core which may be expanded to lock the elements in a predetermined desired angular relation to each other.

Figure 1:
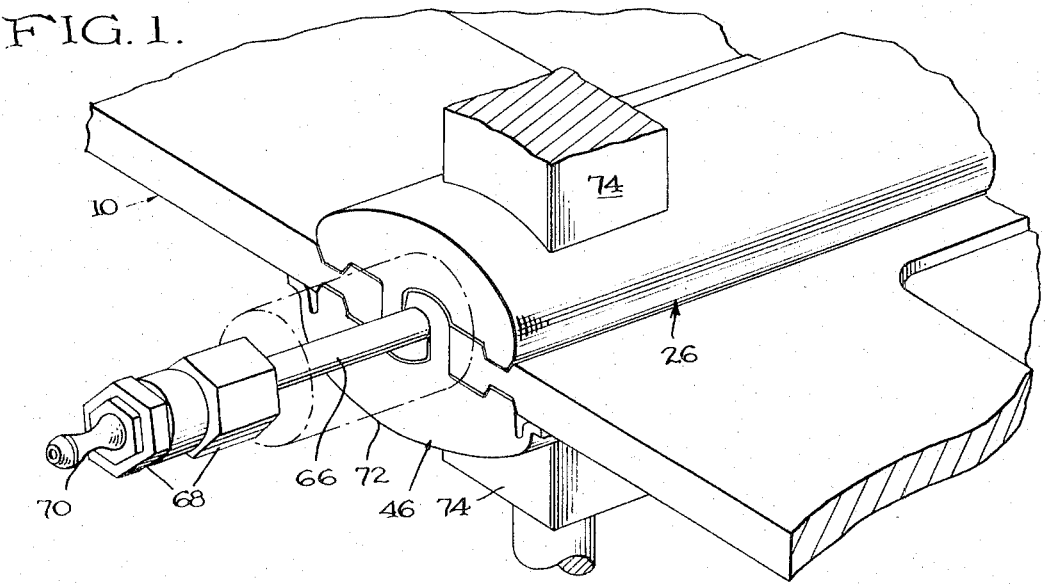
FIG. 1 is a perspective view showing the method of making the fluid core joint in accordance with the invention.
Figure 2:
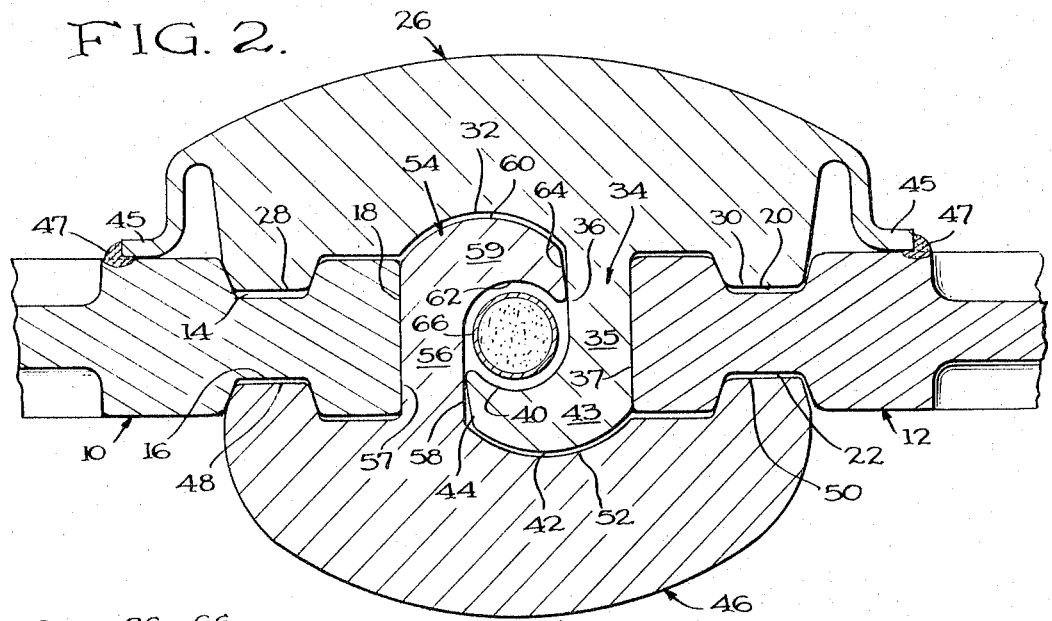
FIG. 2 is a vertical section of the joint of FIG. 1 before the fluid core is expanded.
Figure 2A:
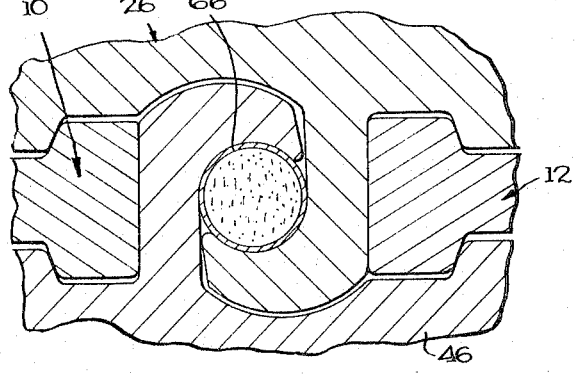
FIG. 2a is a fragmentary view in vertical section of the joint of FIGS. 1 and 2 after the fluid core is expanded.

Referring now to the drawings, and more particularly to FIGS. 1 and 2, there are shown a pair of panel or skin members respectively indicated at 10 and 12, which may, for example, form part of the wall of a booster tank used on a missile or the like. Panel 10 is provided with recesses 14 and 16 on the inner and outer surfaces thereof adjacent but spaced from end edge 18 of the panel. Similarly, panel 12 is recessed on its inner and outer surfaces at 20 and 22 adjacent but spaced from end edge 24 of the panel. An internal cap strip formed of extruded aluminum or the like and generally indicated at 26 is adapted to overlie the inner surfaces of the facing panels 10 and 12 and included projections 28 and 30 which are received in the respective recesses 14 and 20 of panels 10 and 12.

Cap strip 26 also includes an inner arcuate surface 32 which begins adjacent end edge 18 of panel 10 and which merges at its opposite end in an outwardly extending projection generally indicated at 34 of generally J-shaped contour in cross section and including a stem portion 35 bounded by straight edges 36 and 37 which respectively merge with curved edges 40 and 42 defining a hooked or curved end 43. Curved end 43 is also bounded by end edge 44.

Internal cap strip 26 is provided with oppositely disposed flanges 45 which are non-structurally seal welded to the inside surfaces of the respective panels or skins 10 and 12 as indicated at 47.

An external cap strip generally indicated at 46 is provided with projections 48 and 50 which engage recesses 16 and 22 on the outer surfaces of the respective panel or skin members 10 and 12. External cap strip 46 includes an inner curved surface 52 which extends substantially parallel to the curved surface 42 of the hooked portion 43 of internal cap strip 26. External cap strip 46 also includes a projection generally indicated at 54, or J-shaped contour, including a stem portion 56 having opposite side edges 57 and 58 which respectively merge with curved surfaces 60 and 62 to define a hook portion 59. Curved surface 60 of hook portion 59 extends parallel to the curved surface 32 of inner cap strip 26, and curved surface 62 of hook portion 58 lies on the same circle as arcuate surface 40 of hook portion 43 of inner cap strip 26. Curved surfaces 60 and 62 of the hooked portion 59 terminate in end edge 64.

When the inner and outer cap strips 26 and 46 are assembled with respect to panels 10 and 12 as shown in FIGS. 1 and 2, a generally cylindrical-shaped cavity is defined by the oppositely-disposed curved surfaces 40 and 62 of the respective hook-shaped end portions 43 and 59.

In accordance with the method and construction of the invention, an expandable fluid core is positioned in the cavity just described and a hardenable fluid material is injected into the expandable core to force the structural members forming the joint into fluid-tight rigidly assembled and interlocked relation, as will now be described.

A thin-walled tube 66 having a normal unexpanded internal diameter less than the diameter of the circle on which arcuate surfaces 40 and 62 lie, and having a length somewhat longer than the joint length, is inserted into the cavity previously defined. Fittings generally indicated at 68 are installed on the protruding end of thin-walled tube 66, fittings 68 being threaded to receive a "zerk" type fitting 70. A split retainer member indicated at 72 is positioned around the protruding end of thin-walled tube 66 between the fittings 68 and the facing edges of panels 10 and 12 to prevent the tube from rupturing during the core-forming operation. With the parts assembled as shown in FIG. 1, and clamped in position by suitable mechanical, hydraulic or pneumatic clamps 74, thin-walled tube 66 is filled through fitting 70 with a suitable hardenable fluid until the opposite end of the tube overflows. When overflow of the fluid occurs, a suitable cap or plug is applied to the opposite end of thin-walled tube 66. The hardenable fluid material may be any suitable material which may be injected into the core in a fluid state and subsequently hardens in the core. One example of fluid materials, which may be used, is an epoxy resin with a proper filler material. The materials used should be chosen to have minimum shrinkage and should harden by chemical action or cooling.

After tube 66 has been initially filled and capped as just described, additional hardenable fluid material is then injected under pressure through fitting 70 into tube 66, and causes tube 66 to expand within the cavity in which it is positioned until the outer periphery of the tube is expanded tightly against the abutting arcuate surfaces 40 and 62 of the respective hook-like projections 43 and 59 of cap strips 26 and 46, respectively. The expansion of the fluid core and its confining thin-walled tube 66 forces the cap strips and panels or skin members 10 and 12 into tightly interlocked fluid-tight engagement with each other to hold the joint structure in rigidly secured condition after the fluid material hardens.

After a suitable "curing" period, the tube is trimmed flush to the skin or panel and the joint is complete. The cut-off ends are soaked in a solvent and the fittings cleaned and salvaged for re-use.

The fluid core hereinbefore described may also be used with other types of joint configurations. Thus, in the configurations shown in FIGS. 3, 4, and 5, the panels or skins themselves are formed with interlocking end edge portions which define a cavity for receiving a fluid core without the use of cap strips.

Thus, in FIG. 3 there is shown a joint between a pair of skin or panel members generally indicated at 76 and 78, each of which has a specially formed end 80, 82, respectively. Each of the ends 80, 82 includes a stepped portion 84 and 86 which is adapted to receive a complementary overhanging lip portion 88, 90 on the other panel or skin member. The two ends 80, 82 are provided with complementary generally semicircular recesses which receive a fluid core generally indicated at 92.

There is shown in FIG. 4 a joint construction in which each of the panel or skin members 94, 96 is provided with a generally J-shaped end portion 98, 100, respectively, which are engaged in complementary interlocking and internesting relation with each other. The two end portions 98 and 100 are provided with complementary recesses which cooperate to define a cavity of generally circular cross section to receive a fluid core 102.

In the joint construction of FIG. 5, a pair of panel or skin members 104, 106 are provided with specially contoured interlocking end portions 108, 110, respectively, each including a projection 112, 114 which is received in a complementary cavity of the other formed end, and each including a stepped portion 116, 118 which receives an overlying projection of the other end portion. The projecting portions 112, 114 of the respective contoured ends 108, 110 are provided with complementary recesses in the facing surfaces thereof to define a cavity of generally circular cross section which receives a fluid core 119.

In each of the modified joint structures of FIGS. 3, 4, and 5, the respective fluid cores 92, 102, and 119 may be expanded by the injection of pressurized hardenable fluid material into the thin-walled tubes bounding the respective fluid cores, as described in connection with the embodiment of FIGS. 1 and 2, in such manner as to expand the respective cores into tight engagement with the bounding surfaces of the cavities in which the respective cores are received, and to force the panel or skin ends into tightly interlocked relation with each other, so that when the fluid material of the core hardens, it will hold the structural elements forming the joint in tightly and rigidly assembled fluid-tight relation.

In using the fluid core joint of the invention, it is possible to fabricate preliminary shippable sub-assemblies at the factory which are shipped to the site of utilization and assembled into larger sub-assemblies which, in turn, are assembled into the final tank assembly. This is shown in FIGS. 7a, 7b, and 7c, which illustrate the subsequent assembly operations at the site of utilization.

Thus, as shown in FIG. 7a, a pair of unit panels or details 120 and 120' of a suitable metal are each respectively explosively or otherwise suitably formed into the rough intermediate shape indicated at 120A and 120A', and a pair of such unit panels are then rough trimmed to the configuration of the particular panel detail which they are to assume in the final dome assembly. The two rough-trimmed panels are then machined or chem-milled to form the panel units 120B and 120B'. The two panels 120B and 120B' are then joined together by internal and external cap strips 122, 124, similar to the cap strips 26 and 46 shown in FIG. 2, these cap strips being contoured to cooperate with the edges of the panels being jointed and with each other to receive a fluid core as previously described in connection with FIGS. 1 and 2. The fluid core joint generally designated at 125 in FIG. 7a, is expanded to rigidly join the two abutting lengthwise edges of the unit panels 120B and 120B'. The two joined panels 120B and 120B' are then mounted on a suitable fixture and their remaining edges are milled as required to produce the shippable dome sub-assembly generally indicated at 126. The sub-assembly 126 has the proper spherical curvature conforming to the position which this particular sub-assembly will occupy in the final dome segment shown in FIGS. 8a, 8b and 8c as will be described hereinafter.

In a similar manner, as seen in FIG. 7b, a second dome sub-assembly generally indicated at 128 is formed to include three unit panels 128A, 128B, and 128C, each of which is formed in a manner similar to that described in connection with unit panels 120B and 120B', and which are joined to each other by longitudinally-extending internal and external cap strips to define fluid core joints 130 which rigidly unite the cap strips and panels together.

Similarly, as seen in FIG. 7c, a third sub-assembly generally indicated at 132 is formed of four units panels 132A, 132B, 132C, 132D, which are connected to each other by longitudinally-extending fluid core joints 134. The edges 137 of sub-assembly 132 lie on circular arcs.

The joints between the unit panels of the respective sub-assemblies 126, 128, 132, are all non-structurally seal welded similarly to the seal weld 47 of FIG. 2.

As will be explained more fully hereinafter in connection with FIGS. 8a, 8b, the three dome sub-assemblies 126, 128, and 132 are assembled at the site of use to form a dome segment.

In FIG. 7d, there is shown a single blank 136 which is edge milled and chem-milled to produce the intermediate form indicated at 136A, which is then shaped into an arcuate cylindrical segment as indicated at 136B to form part of the cylindrical portion of the finally assembled tank as will be described more fully hereinafter.

Referring now to FIGS. 8a and 8b which illustrate the method of assembling the dome sub-assemblies 126, 128, and 132 at the site of utilization, it will be seen that sub-assembly 126 is joined to sub-assembly 128 by internal and external cap strips 138 and 140 which respectively join the abutting edges 142, 144 lying in a plane transverse of the longitudinal axis of the dome segment. Similarly, internal and external cap strips 146 and 148 join the edges 150 and 152 of the dome sub-assemblies 128 and 132 which lie in a plane transverse of the longitudinal axis of the dome segment.

A fluid core of the type described in connection with the embodiment of FIGS. 1 and 2 is received in the joint between each pair of edges 142–144, and 150–152, and expands each of these joints into rigidly assembled relation when the material of the core hardens. The final dome gore segment resulting from the fluid core joining of the sub-assemblies 126, 128, 132 is indicated at 154 in FIG. 8b. It will be noted that the joints between unit panels of the respective sub-assemblies 126, 128, 132 are in staggered relation to each other.

The next step is to fabricate at the site of utilization a ⅙ tank segment such as that generally indicated at 156 in FIG. 8c. The ⅙ tank segment in the illustrated embodiment is fabricated by joining together six tank barrel skins of cylindrical segmental form, such as those indicated at $136B_1$–$136B_6$, inclusive each of which is similar to the cylindrical segment 136B of FIG. 7d. A dome gore segment 154A is joined to the forward end of cylindrical segment $136B_1$, and a second dome gore segment 154B is joined to the rearward end of the cylindrical segment $136B_6$.

The joints between the dome gore segment 154A and the adjacent cylindrical barrel segment $136B_1$, between each of the adjacent barrel segments $136B_2$–$136B_6$, inclusive, and between the barrel segment $136B_6$ and the dome gore segment 154B, each includes internal and external cap strips 153, 155, of the type previously described, and an expandable hardenable fluid core is used at each of the joints to secure the cap strips and panels in rigidly assembled relation.

After the ⅙ tank segment or section indicated at 156 and shown in FIG. 8c has been fabricated as just described, the sub-assembly 156 is placed on a suitable fixture and is milled along the outer longitudinal edges thereof. Six of the ⅙ tank segments are then assembled at the site of utilization into the completed tank assembly indicated at 160 in FIG. 9. This assembly operation is accomplished by first placing two of the ⅙ tank segments 156 in a suitable holding fixture and joining the mating lengthwise edges of adjacent ⅙ tank segments, using internal and external cap strips and expandable hardenable fluid cores of the type previously described to provide a rigid joint between the adjacent longitudinal edges. The cap strips are held in place by suitable clamping devices, while the fluid material of the fluid core hardens. The joint is also seal welded in the manner indicated at 47 in FIG. 2.

After the first joint just described between two adjacent ⅙ tank segments is cured, trimmed, and seal welded, a third ⅙ tank segment 156 is spliced or jointed to the two segments which have already been joined, thereby completing the assembly of one-half of the final tank. The one-half tank thus fabricated is then removed from the holding fixture and the other half of the tank is fabricated in a similar manner. After the completion of the fabrication of the second half of the tank, and with the second half tank still in the holding fixture, the previously assembled half is brought back to the fixture, inverted, and set down on top of the tank half already in the fixture. The joint is made between the corresponding mating edges of the two halves of the tank, using the cap strips and expandable fluid cores as previously described, and after these joints have been completed, the tank assembly is then complete. The completed tank is then removed from the fixture. After the completion of the tank, the end openings thereof may be temporarily sealed, and the interior of the tank may be pressurized with low pressure gas, such as dry nitrogen with a tracer gas. A mass spectrometer or other suitable leak detector may be used to detect leaks. After a good leak-proof assembly has been assured, the tank is cleaned and treated as required.

An important feature of the construction, as best seen from an examination of FIGS. 7a–7d, 8b, 10, and 11, is the fact that the edges bounding joints 125, 130, and 134 of the unit panels 120B, 120B', 128A–128C, inclusive, and 132A–132D inclusive, as well as the panel edges forming the longitudinal edges 158 of the dome segments 154 (FIG. 8b), all lie on the same radius of curvature as that of the arcuate edges 137 of the cylindrical barrel portion of the tank formed from the plurality of cylindrical segments $136B_1$–$136B_6$, inclusive. Hence, the same fixtures and tools may be used for finishing all of the edges just mentioned. This results in a major saving of tooling costs. The uniform radius of the barrel and of the dome also permits forming the internal and external cap strips for the dome segments and for the cylindrical barrel segments on a single tool, resulting in a further saving in tool costs.

There is shown in FIG. 12 another application of the fluid core joint in which two honeycomb panels respectively generally indicated at 200 and 202 are jointed together. Honeycomb panels 200 includes inner and outer skins 204 and 206, respectively, and a honeycomb core 208. End edge cap of extruded aluminum or the like, generally indicated at 210, is provided for the panel 200 and is structurally welded to the ends of skins 204 and 206, as indicated at 212. Similarly, the honeycomb panel 202 includes inner and outer skins 214 and 216, respectively, and a honeycomb core 218. An end cap 220 of extruded aluminum is welded to the inner and outer skins 214 and 216 at 222. An extruded longeron or main strut generally indicated at 224 is provided with a dovetail-shaped slot 226 which is adapted to receive the end portions 228 and 230 of the respective end caps 210 and 220. Similarly, the lower outside cap strip 232 is provided with a dovetail-shaped slot 234 which is adapted to receive the ends 236 and 238 of the respective end caps 210 and 220. The end edges of end caps 210 and 220 are contoured to receive a pair of wedge members 240 and 242, respectively, which are made of extruded aluminum or the like, and the inner faces of the wedges 240, 242 are formed with arcuate surfaces which define a cavity which receives a fluid core generally indicated at 244. The fluid core 244 is similar to those previously described, and when the hardenable fluid material is introduced under pressure into the interior of the thin-walled tube which confines the fluid core, the thin-walled tube is moved into expanded relation to wedges 240, 242, and causes the wedges to force the end caps 210, 220 into tight rigid engagement with the longeron 224, and with the exterior cap strip 232, this condition being maintained permanently by he hardening of the fluid core material. The longeron 224, and the cap strip 232 are seal welded to the end caps 210 and 220 as indicated at 246.

There is shown in FIG. 13 a modified type of fluid core joint generally similar to that shown and described in connection with FIG. 12, but modified for use with transition joints between a cylindrical barrel section and a hemispherical section. The joint structure of FIG. 13 is adapted to join honeycomb panel 250 which lies in the cylindrical barrel section of the structure, and a honeycomb panel 252 which lies in the hemispherical dome-shaped portion of the structure. Each of the panels 250, 252, has an edge formed as an end cap 254, 256, respectively, structurally welded to the inner and outer skins of the respective panel members. The inner cap strip 258 is provided with a dovetail slot which receives the ends or flanges 260 and 262 of the respective end caps 254, 256. Outer cap strip 264 is provided with a dovetail slot which receives the ends or flanges 266, 268 of the respective end caps 254, 256. The respective end caps are non-structurally seal welded to the respective ends of the panels as indicated at 270. The end edges of cap members 254, 256 are contoured to receive the wedges 272, 274 of extruded aluminum or the like. The inner surfaces of the wedges 272, 274 are contoured to receive a fluid core 276 which may be expanded as previously explained to move the wedges 272, 274 into tightly wedged relation with the adjacent end caps 254, 256, to thereby rigidly secure the end caps 254, 256, and the cap strips 258, 264 in rigidly assembled relation, this relation being maintained permanently by the hardening of the material of the fluid core.

In another embodiment of the invention, shown in FIGS. 14 and 15, the fluid core principle is used to provide an expandable bolt-like member generally indicated at 300. The member 300 includes a thin-walled tube 302 closed at its innermost end and having suitably attached to the outer end thereof a cap or base member 304. A fitting 306, similar to the fitting 70 of FIG. 1, extends through cap member 304 and into communication with the interior of tube 302. The bolt member 300 may be used to secure a plurality of plate-like members together, as shown in FIG. 15, in which tube 302 extends through aligned passages in plates or panels 308, 310 and 312. The passages in plates 308 and 312 are preferably tapered from the outermost surface thereof in the direction of inner plate 310, to provide a better interlocking engagement with the expanded fluid core. A hardenable fluid is introduced under pressure into the interior of thin-walled tube 302 through fitting 306 until the fluid core bears tightly against the adjacent surfaces of the passages through panels 308, 310, 312, are held in rigidly secured and assembled relation to each other. Cap 304 remains outside of the aligned passages through the panels and may be removed after the fluid core hardens.

There is shown another application of the fluid core in FIG. 16 in which two members 314 and 316 are provided with aligned apertures to receive an expandable fluid core blot 300' similar to the bolt 300 of FIG. 14 and having a thin-walled tube into which hardenable fluid may be introduced. The thin-walled tube of bolt 300' is sufficiently filled with the hardenable fluid to provide a suitable pivotal support for members 314 and 316. When the members 314, 316 are in a desired adjusted angular position with respect to each other, additional hardenable fluid is introduced into the interior of the thin-walled tube to cause the fluid core to expand tightly into binding engagement with the aligned passages in the respective members 314, 316 in which the expandable bolt is received. When the fluid hardens, the members 314, 316 are maintained rigidly in the desired angular position.

It can be seen from the foregoing that there is provided in accordance with this invention an improved joint construction and method of jointing which have many advantages and which provide 100 percent linear structural contact throughout the entire length of the joint despite varying tolerances of the elements being joined, and which permit the rigid fluid-tight interconnection of structural members substantially without the use of bolts or pins, and entirely without structural welding. The joint structure and method of jointing of the invention have particular utility in the construction of large tanks such as those used on missiles and other space vehicles, and permits the factory fabrication of sub-assemblies which may be shipped to the site of use without any transportation problems. The shippable sub-assemblies may then be assembled into the final structure at the site of use without the use of large hydrostatic or gas test facilities and with a minimum of major tooling at the site of use.

While there have been shown and described particular embodiments of the invention, it will be obvious that various changes and modifications may be made therein without departing from the invention and, therefore, it is aimed to cover all such changes and modifications as fall within the true spirit and scope of the invention.

What is claimed is:

1. A joint construction comprising:
  adjacent coplaner edges of two structural members;
  oppositely extending flanges on each said edge extending in a plane transverse to that of said edges;
  first and second cap strips extending between said edges on opposite sides thereof;
  inwardly facing slots on each of said cap strips receiving one of said flanges on each of said edges;
  wedge means between the facing ends of said edges, said wedge means and facing ends defining a cavity therebetween; and
  an initially fluid material filling said cavity and urging said wedge means against said facing ends to urge said flanges against the sides of said slots in said cap strips.

2. A joint construction, as set forth in claim 1, wherein said fluid material is hardenable to form a permanent joint.

3. A joint construction, as set forth in claim 1 wherein said wedge means includes:
  a pair of wedges which taper in opposite direction with the wider ends thereof facing each other and defining a portion of said cavity.

4. A joint construction, as set forth in claim 1, further including:
  an expandable closed tubular member within said cavity, said fluid material entirely filling and expanding said tubular member into firm engagement with said wedge means.

5. A joint structure, as set forth in claim 1, wherein said slots are dovetailed and said flanges have cooperating dovetail edges engaging said dovetailed slot.

References Cited by the Examiner
UNITED STATES PATENTS

| | | | |
|---|---|---|---|
| 2,386,958 | 10/1945 | Jackson | 220—81 X |
| 2,402,253 | 6/1946 | Macleod | 220—81 |
| 2,492,605 | 12/1949 | Varney | 85—65 |
| 2,562,724 | 7/1951 | Lebert | 85—65 X |
| 2,644,553 | 7/1953 | Cushman. | |
| 2,727,286 | 12/1955 | Moore | 220—76 X |
| 2,751,109 | 6/1956 | Moore | 220—81 X |
| 2,760,673 | 8/1956 | Laurent | 220—46 |
| 2,870,881 | 1/1959 | Rogge | 85—65 |
| 2,876,725 | 3/1959 | Buck. | |
| 3,024,938 | 3/1962 | Watten | 220—75 X |
| 3,241,701 | 3/1966 | Boggs | 220—81 X |

THERON E. CONDON, *Primary Examiner.*

GEORGE E. LOWRANCE, *Examiner.*